United States Patent
Thangeswaran

(10) Patent No.: US 11,082,533 B2
(45) Date of Patent: *Aug. 3, 2021

(54) SOFTWARE APPLICATION ARCHITECTURE

(71) Applicant: Nasdaq, Inc., New York, NY (US)

(72) Inventor: Sivakumaresan Thangeswaran, Bangalore (IN)

(73) Assignee: NASDAQ, Inc., New York, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/736,133

(22) Filed: Jan. 7, 2020

(65) Prior Publication Data

US 2020/0213420 A1     Jul. 2, 2020

Related U.S. Application Data

(63) Continuation of application No. 16/202,373, filed on Nov. 28, 2018, now Pat. No. 10,554,785, which is a continuation of application No. 15/219,913, filed on Jul. 26, 2016, now abandoned.

(30) Foreign Application Priority Data

Jul. 30, 2015    (IN) ........................ 2343/DEL/2015

(51) Int. Cl.
    *H04L 29/08*       (2006.01)
    *H04L 29/06*       (2006.01)

(52) U.S. Cl.
    CPC .............. *H04L 67/34* (2013.01); *H04L 67/02* (2013.01); *H04L 67/32* (2013.01); *H04L 67/42* (2013.01); *H04L 69/22* (2013.01)

(58) Field of Classification Search
CPC ...................................................... H04L 67/34
See application file for complete search history.

(56) References Cited

U.S. PATENT DOCUMENTS

| 2010/0082813 A1 | 4/2010 | Li et al. |
| 2013/0332917 A1 | 12/2013 | Gaither et al. |

(Continued)

FOREIGN PATENT DOCUMENTS

CN           103399693 A     11/2013

OTHER PUBLICATIONS

NGOC, "Single Page Web Applications with Restful API and AngularJS," Helsinki Metropolia University of Applied Sciences Thesis: Nov. 1, 2014; https://www.theseus.fi/bitstream/handle/10024/84236/Thesis_SPA/pdf?sequence=1&isAllowed=y (Year: 2014).*

(Continued)

*Primary Examiner* — Suraj M Joshi
(74) *Attorney, Agent, or Firm* — Nixon & Vanderhye, P.O.

(57) ABSTRACT

The described technology relates to a software application architecture allowing for creation of a web application that has multiple Single Page Applications (SPAs) within the application. The software application architecture includes components that are common to each page of the web application while also having components that are dynamically loaded to cater to specific respective pages within the application. The dynamically loadable components can be identified based on an identifier in a path being browsed using a web browser application. The described application architecture may be used in the context of AngularJS, as well as other SPA technologies and non-SPA technologies.

13 Claims, 10 Drawing Sheets

(56) References Cited

U.S. PATENT DOCUMENTS

| | | |
|---|---|---|
| 2014/0100668 A1 | 4/2014 | Jundt et al. |
| 2015/0007278 A1 | 1/2015 | Benezra |
| 2015/0052498 A1 | 2/2015 | Chauhan et al. |
| 2015/0188779 A1* | 7/2015 | McCanne ............... H04L 63/10 709/203 |

OTHER PUBLICATIONS

NYGARD, "Single Page architecture as basis for web applications," In: Aalto University Thesis, Jun. 6, 2015; https://pdfs.semanticscholar.org/6dd3/a3d02ecda3b52ae4a000e50c565ab41ec0d2.pdf (Year: 2015).*

Ngoc, "Single Page Web Application with Restful API and AngularJS." Helsinki Metropolia University of Applied Sciences Thesis; Nov. 1, 2014; retrieved from https://www.theseus.fi/bitstream/handle/10024/84236/Thesis_SPA.pdf?sequence=1&isAllowed=y (Year: 2014).

Nygard, "Single page architecture as basis for web applications."; Aalto University Thesis; Jun. 6, 2015; retrieved from https://aaltodoc.aalto.fi/bitstream/handle/123456789/17773/master_Nyg%C3%A5rd_Klaus_2015.pdf?sequence=1.

Nygard, "Single Page architecture as basis for web applications," In: Aalto University Thesis, Jun. 6, 2015; https://pdfs.sennanticscholar.org/6dd3/a3d02ecda3b52ae4a000e50c565ab41ecOd2.pdf (Year: 2015).

International Search Report and Written Opinion dated Oct. 11, 2016 for PCT Application No. PCT/US2016/044219.

Office Action in related Chinese Application No. 201680056904.3 dated Jan. 9, 2019 (with translation).

* cited by examiner

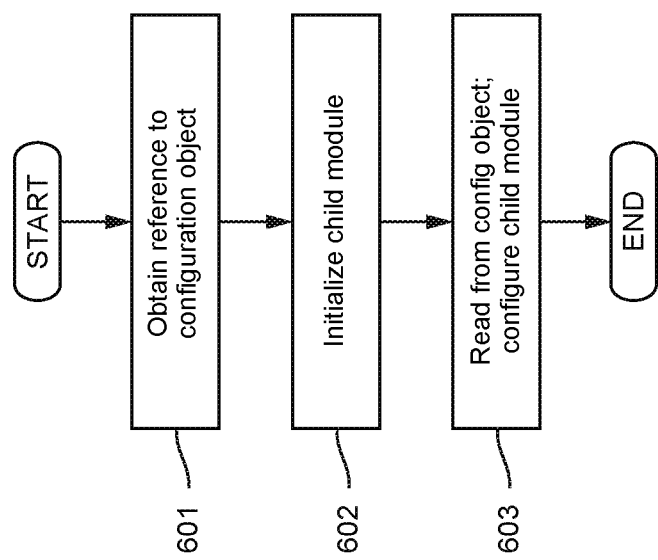

```xml
<?xml version="1.0" encoding="utf-8" ?>
<Page Id="100000" Name="firm" SubAppId="10000000" SubAppName="IR">
  <Dependencies>
    <Dependency SubApp="Financial">ui.treeview</Dependency>
  </Dependencies>
  <ExternalScripts>
    <SubAppScripts SubApp="Financial">
      <Scripts>
        <Script>research/research.js</Script>
        <Script>research/researchSharedService.js</Script>
        ...
        <Script>research/filters/exactMatchFilter.js</Script>
      </Scripts>
    </SubAppScripts>
    <SubAppScripts SubApp="IR">
      <Scripts>
        <Script>shared/directives/sharedDirectives.js</Script>
        <Script>events/controllers/detailsController.js</Script>
        ...
      </Scripts>
    </SubAppScripts>
  </ExternalScripts>
  <Directives>
    ...
  </Directives>
  <Filters>
    ...
  </Filters>
  <States>
    <State Id="2" Name="firm" Url="/firm/:id" TemplateUrl="firmHome.html" Controller="firmController" Entitlements="Research">
      <ChildStates>
        <State Id="21" Name="overview" Url="/overview" TemplateUrl="overview.html" Controller="firmInfoController" />
        <State Id="22" Name="firmcontacts" Url="/firmContacts" TemplateUrl="firmContacts.html" Controller="firmContactController" />
      </ChildStates>
    </State>
  </States>
  <Sections>
    <Section Id="1" Name="Research" Entitlements="Research" />
    <Section Id="2" Name="Estimate" Entitlements="Estimates" />
  </Sections>
</Page>
```

```
var firmConfig = {
   "subAppId": 10000000,
   "subAppName": "IR",
   "featureId": 100000,
   "featureName": "firm",
   "isComposite": false,
   "typeId": 0,
   "dependencies": [ "ui.treeview" ],
   "controllers": [ . . . ],
   "services": [ . . . ],
   "directives": [ . . . ],
   "filters": [ . . .   ],
   "views": [
      {
         "id": 2,
         "name": "firm",
         "url": "/firm/:id",
         "templateUrl": "Areas/IR/Apps/firm/templates/firmHome.html",
         "controller": "firmController",
         "childViews": [
            {
               "id": 21,
               "name": "overview",
               "url": "/overview",
               "templateUrl": "Areas/IR/Apps/firm/includes/overview.html",
               "controller": "firmInfoController"
            },
            {
               "id": 22,
               "name": "firmcontacts",
               "url": "/firmContacts",
               "templateUrl": "Areas/IR/Apps/firm/includes/firmContacts.html",
               "controller": "firmContactController"
            }
         ],
      }
   ],                                              701
   "scripts": [
      . . .
      "Areas/Financial/Apps/research/research.js",
      "Areas/Financial/Apps/research/researchSharedService.js",
      . . .
      "Areas/IR/Apps/shared/directives/sharedDirectives.js",
      "Areas/IR/Apps/events/controllers/detailsController.js",
       ". . .
   ],
   "sections": [
      { "id": 1, "name": "Research" },
      { "id": 2, "name": "Estimate" }
   ]
};
```

FIG. 7B

SOFTWARE APPLICATION ARCHITECTURE

CROSS REFERENCE TO RELATED APPLICATIONS

This application is a continuation of U.S. patent application Ser. No. 16/202,373 filed Nov. 28, 2018 which is a continuation of U.S. patent application Ser. No. 15/219,913 filed Jul. 26, 2016 (now abandoned), which is related to the commonly assigned application entitled "Application Logging Framework" (U.S. patent application Ser. No. 15/220,047), which was filed on Jul. 26, 2016. This application also claims priority to Indian Patent Application No. 2343/DEL/2015 filed on Jul. 30, 2015. The entire contents of each of these applications are hereby incorporated by reference for all purposes.

BACKGROUND

In traditional web application designs, a web application is composed of a number of different web pages. To render a particular web page within the application, the following set of interactions is performed: a web browser at a client device requests (using a Hypertext Transfer Protocol (HTTP) message) a particular web page from a web server; in response, the web server transmits (using HTTP) the code for the page back to the web browser, the code including, e.g., Hypertext Markup Language (HTML), JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

Single-page applications (SPA) are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page in the way described above with the traditional web application, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

A web application framework that can be used to create SPAs is AngularJS®. AngularJS is a JavaScript framework. When developing an AngularJS application, the developer creates HTML templates according to AngularJS's template language; the HTML templates include HTML that is embedded with AngularJS scripts and other AngularJS coding constructs, such as directives. At the web browser, AngularJS JavaScript libraries are loaded and interpret the HTML templates, such that the resulting pages look and behave as defined in the templates.

FIG. 1A shows a number of different aspects of a sample SPA 150 of the related art. FIG. 1A shows an example HTML code block 152 for the SPA 150 (the code block 152, which includes AngularJS code), a data model 154 corresponding to the SPA 154, and an example user interface 156 produced by the SPA 150. As will be described in more detail below, the HTML code block 152 may be processed by a web browser; during this processing, the SPA 150 may be represented according to the shown data model 154; and the resulting example user interface 156 may be generated based on the data model 154 and shown in a window of the web browser.

As shown in FIG. 1A, the code block 152 defines a content controller (called "contentCtrl") as part of a content module; when the code block 152 is being processed, the SPA 150 can use to content controller to populate/generate the resulting user interface 156.

In the example code block 152 shown in FIG. 1A, a division element (i.e., <DIV> element) is identified by the ID of "contentModule" and contains a string with the text "Today is." Additionally, this <DIV> element is associated with a content controller (called "contentCtrl"); and the contentCtrl is defined as having a function called "getDate( )" which is defined using a "$scope" object. Thus, when the web browser processes the code block 152, it will load the contentCtrl and call its getDate( ) function. The web browser, during the processing, will also read in the "Today is" string from within the <DIV> element, and append the result of the getData( ) function to the "Today is" string, resulting in the example "Today is 4/16/2015" string shown in the user interface 156.

FIG. 1B shows a non-limiting example system 140 of the related art, the system 140 including a client device 100 and server 120. FIG. 1B also shows an example sequence of events that occurs, as defined in the related art, when the client device 100 requests to load a particular web page hosted at the server 120 using conventional AngularJS techniques.

At action 101, the client device 100 can transmit an HTTP request message to the server 120. At action 102, the server 120 can transmit to the client 100 a corresponding HTTP response message that includes raw/"uncompiled" HTML. At action 103, the web browser (running in the client device 100) can fetch various AngularJS modules comprising an SPA. At action 104, the client device 100 can perform an AngularJS bootstrap phase of loading the SPA and the associated modules.

At action 105, upon completing the bootstrap phase, the client device 100 can then begin compiling the AngularJS SPA, thereby producing the initial user interface (which may be composed of displayable code/data, such as HTML in conjunction with CSS and other code) for the page. It should be appreciated that the compiling referred to herein relates to AngularJS compiling service. The AngularJS compiling service operates in two phases. First, the compiling service will traverse the DOM and collect all of the directives to create a linking function. Next, the compiling service combines the directives with a scope object to produce the user interface that will be displayed. The scope object is an application object that can take "ownership" of variables and functions. For example, the scope object takes ownership of the "getDate( )" function (as shown in FIG. 1A) that is responsible for generating the current date value that is stored in variable "date."

At action 106, the page enters a runtime data binding phase, during which the page's user interface is displayed at the client device 100. During this phase, the user of the client device 100 can interact with the page's user interface and view data displayed in the user interface. The client device 100 can allow the user to interact with the SPA until termination (at action 107), which could occur based on any variety of triggering events (e.g., the page being reloaded, or the user navigating away from the page).

As noted above, when the page for an SPA is loaded, its contents can be changed through dynamic updating. In AngularJS, the AngularJS "routing" service is one mechanism for structuring how dynamic updating is performed. The AngularJS routing service operates generally as follows: For a given Angular SPA, multiple "views" can be defined; each view is associated with an HTML template that may include AngularJS coding constructs. When a page/SPA is first loaded, each of the HTML views is associated with a particular URL path (or "route"), and the correspondences between views and URL paths are registered with the routing service. As an example, the baseline URL for a page/SPA may be "http://example.com/app," and may include two views, View One and View Two. View One may have a route of "viewone" and be accessible at the URL "http://example.com/app#viewone," while View Two may have a route of "viewtwo" and be accessible at the URL "http://example.com/app#viewtwo." When the page/SPA first loads, it may default to View One and the user interface produced by View One will be displayed in the web browser application. Then, when the user clicks on a link that points to the URL "http://example.com/app#viewtwo," the page/SPA will, via the AngularJS routing service, dynamically load and then display the user interface produced by View Two; this may include performing asynchronous/background HTTP fetches to obtain the content for View Two, and then correspondingly updating the DOM for the page. From the perspective of the user, it may appear as if the user has navigated to an entirely different page (and, in fact, the URL shown in the web browser application will have changed); however, the same page/SPA remains loaded, while only the underlying view has changed.

In addition to AngularJS, a number of other frameworks have been developed that may be used to develop SPAs, including but not limited to Backbone.js, Ember.js, and React.

While extant SPA frameworks have proven to be useful, they possess a number of limitations. Accordingly, improvements in the areas of web technology, SPA technology, and related technology areas are needed.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to a software application architecture allowing for creation of a single web application having multiple SPAs within the application. The software application architecture includes components that are common to each page of the web application while also having components that are dynamically loaded to cater to specific respective pages within the application. The dynamically loadable components can be identified based on an identifier in a path being browsed using a web browser application.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 6 shows a non-limiting method for loading a child module;

FIGS. 7A and 7B show non-limiting example software for generating a child module.

DETAILED DESCRIPTION

Figure 1A:
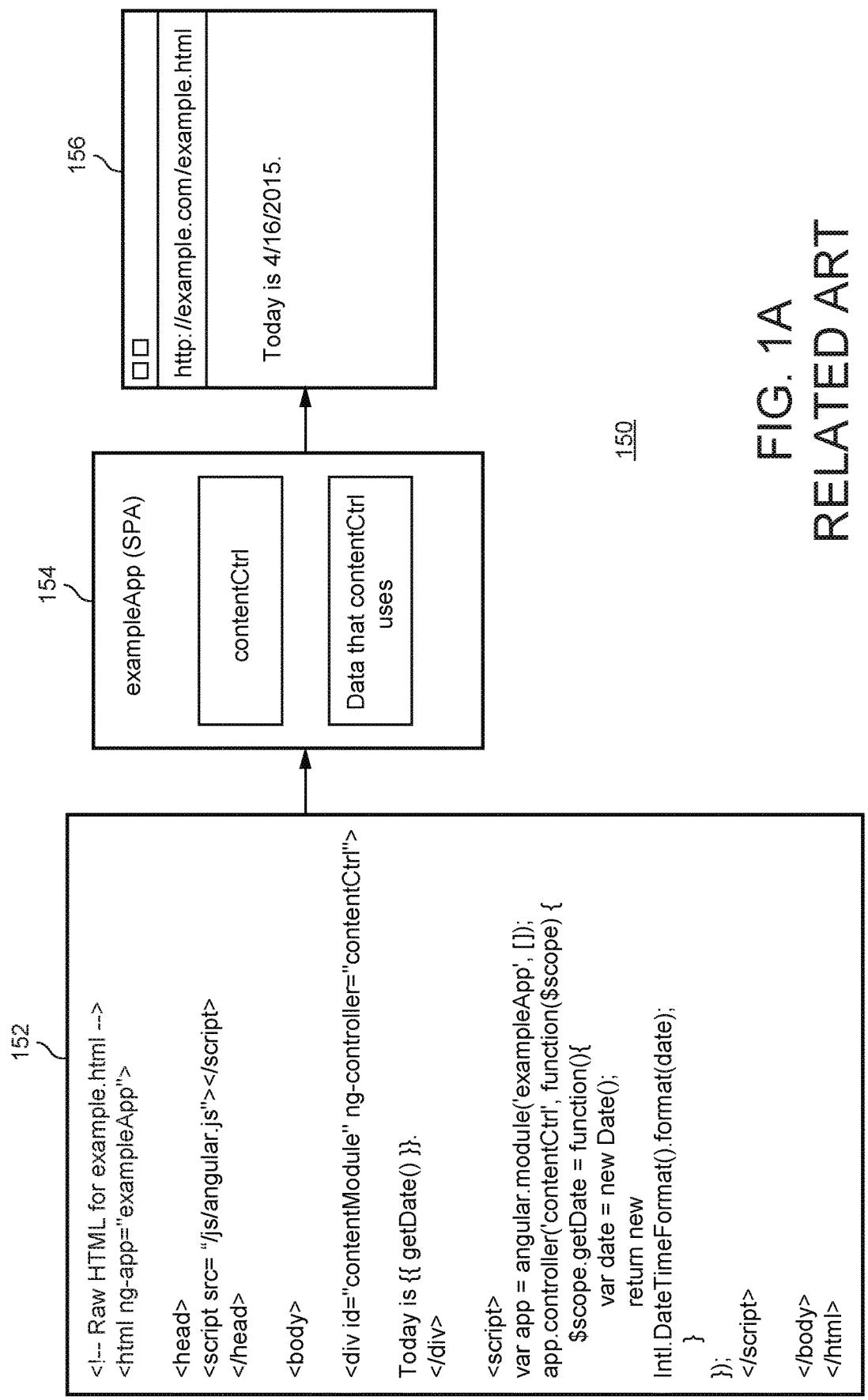
FIG. 1A illustrates a non-limiting example diagram depicting a sample application framework of the related art.
Figure 1B:
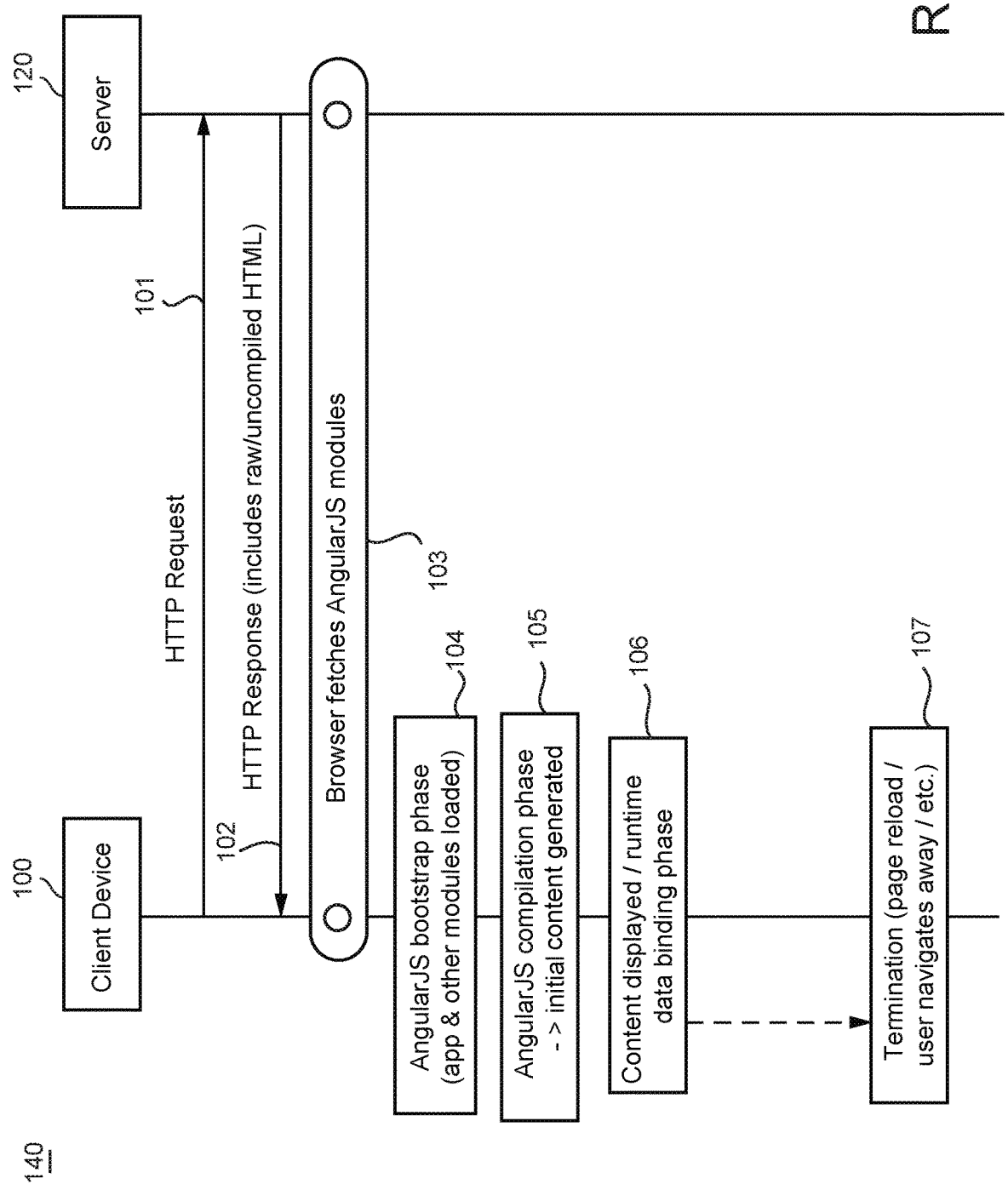
FIG. 1B shows a non-limiting example communication process between a client and server of the related art.

Section headings are used throughout this Detailed Description solely in order to orient the reader as to the general subject matter of each section; as will be seen in the following text, the description of many features spans multiple sections, and headings should not be read as affecting the meaning of the description included in any section.

Selected Definitions

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

As used in this document, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage.

As used in this document, the term "and/or" includes any and all combinations of one or more of the associated listed items.

Overview

The technology described herein relates to a multiple-SPA web application architecture. According to this architecture, each of the SPAs within an application includes at least a global module, a content module, and a child module. The same global module and content module can be used across the application (i.e., may be the same in each of the SPAs that comprise the application); however, the child module for each SPA can be a distinct/different child module. As will be described in further detail below, each child module can be defined during the software development process based on an initial file (e.g., an XML file); the initial file is converted to a corresponding JavaScript file containing a JavaScript Object Notation (JSON) object during the development process, and the resulting JavaScript file is deployed as part of the application; the JSON object (referred to as a "child module configuration object") can represent the respective child module. The child module configuration object may specify data such as scripts used by the child module, views/routes associated with the child module, and/or other data. When one of the SPAs is loaded at a web browser, the following can be performed: the global module and content module are loaded, and a parameter (referred to as the "child module identifier") that corresponds to the child module (and which uniquely identifies the child module within the application) is provided to the content module; then, the content module uses the child module identifier to load the corresponding child module. To load the child module, the content module may perform actions such as (i) obtaining a reference to the child module configuration object (based on the child module identifier), and (ii) initializing and configuring the child module as specified in the child module configuration object.

With this architecture, the shared global module can be responsible for web page content that is common across all of the SPAs in the application (e.g., content such as a header or footer that is featured on every page in the web application), the content module can be responsible for actions such as loading child modules, and the child modules (and, potentially, the views associated with the child modules) can be responsible for providing information that is unique/particular for each SPA within the web application. Thus, for example, if an application defined according to this architecture includes two pages/SPAs (Page One and Page Two), the Page One SPA and Page Two SPA will include the same global module and content module, while the logic, presentation, and other features of Page One and Page Two that are different will be handled by respective different child modules (and, correspondingly, the views associated with the child modules).

Figure 2:
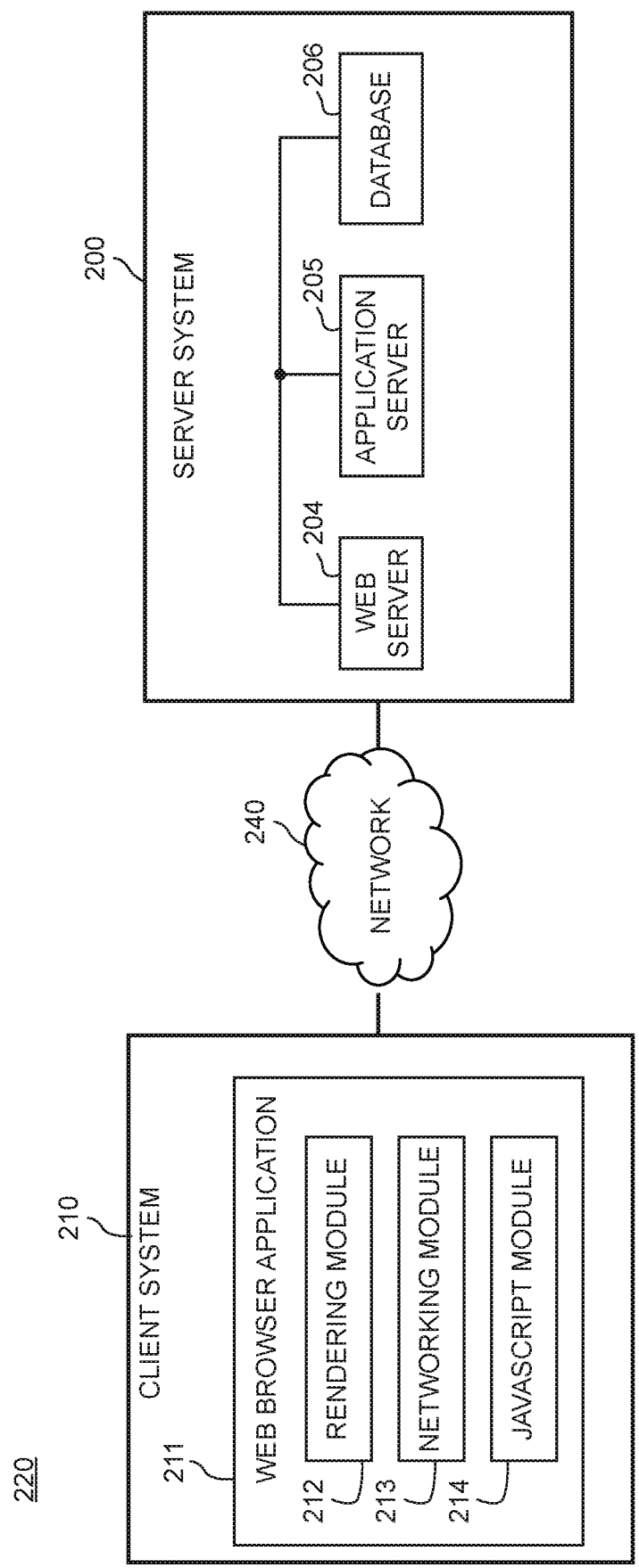
FIG. 2 shows a non-limiting example diagram of a system for carrying out the processes required for implementing the software framework.
Figure 3:
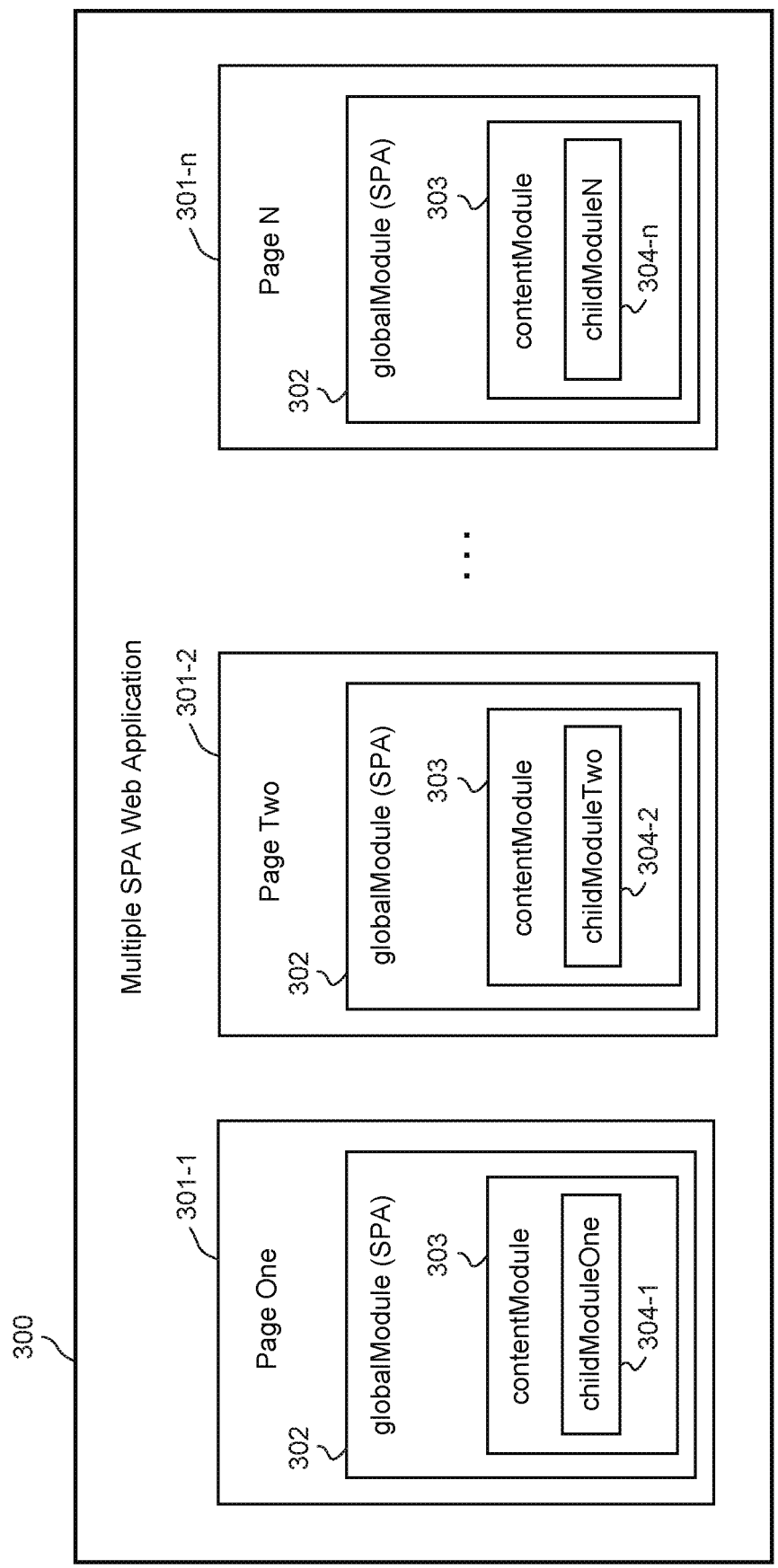
FIG. 3 shows a non-limiting example architecture of the software framework.
Figure 4:
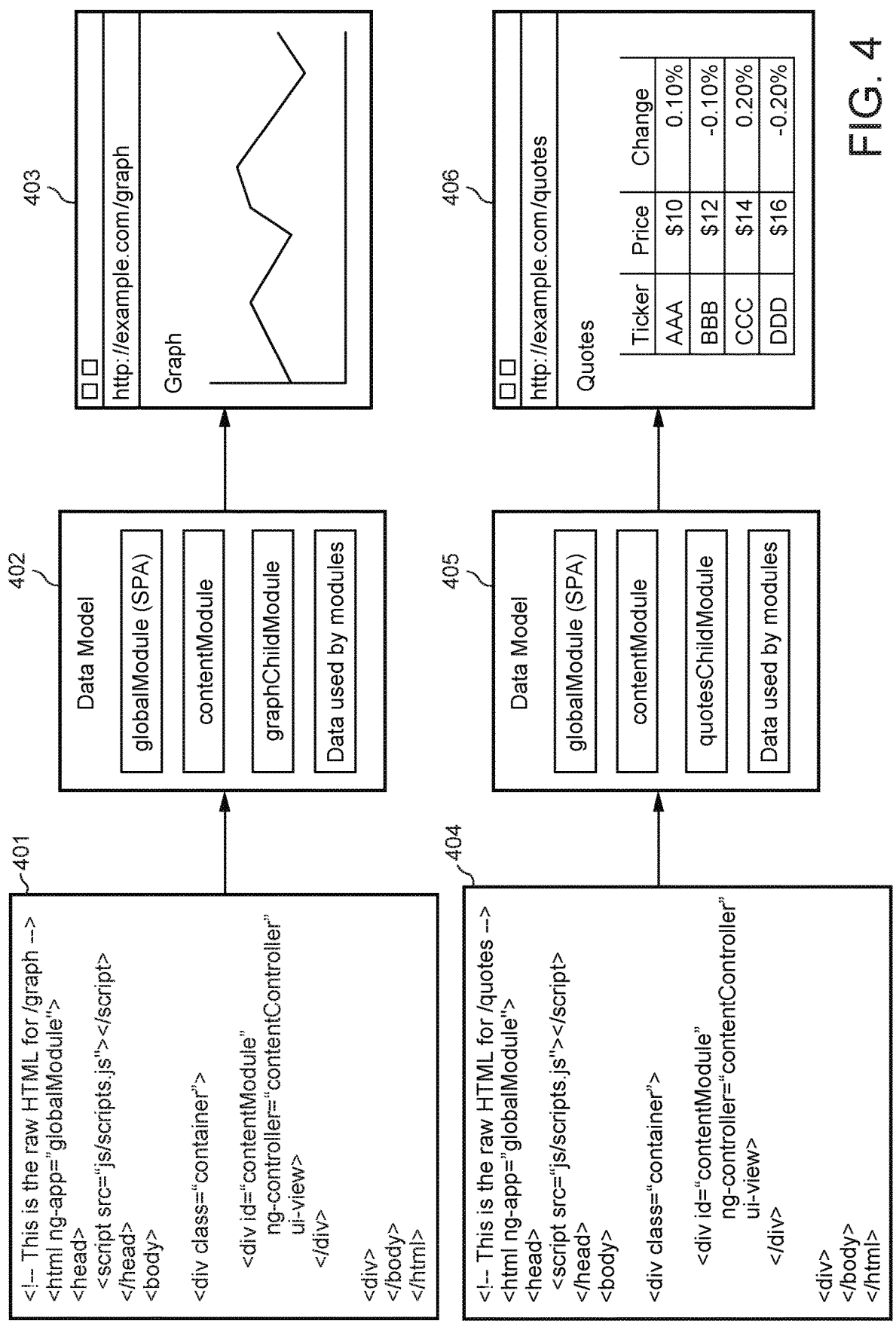
FIG. 4 shows a non-limiting example of an application framework.
Figure 5:
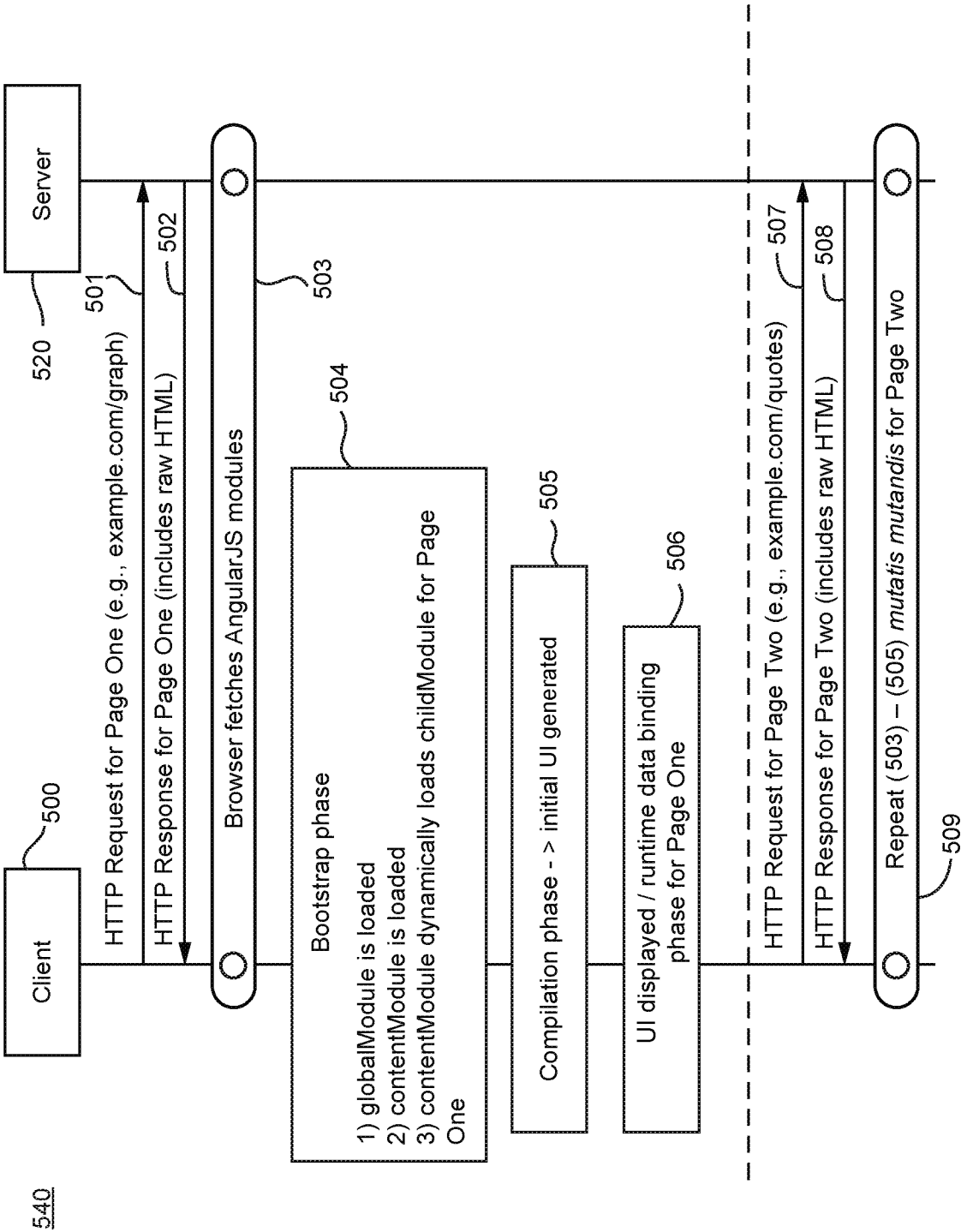
FIG. 5 shows a non-limiting communication process between a client and server in an exemplary system according to the present technology.
Figure 8:
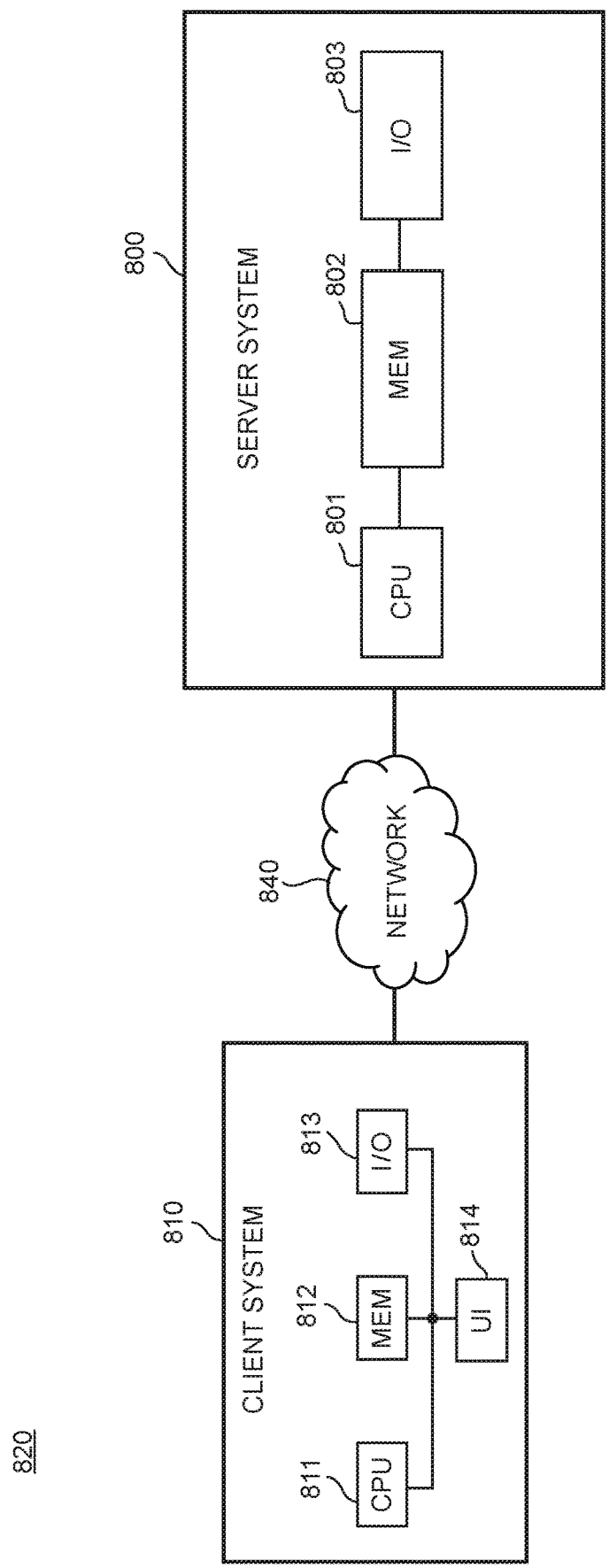
FIG. 8 shows a non-limiting example block diagram of hardware components comprising the system shown in FIG. 2.

FIG. 2 shows an example system in which the multiple-SPA architecture may be implemented, wherein software architecture aspects of the system are highlighted. FIG. 3 is an architecture diagram that shows an example web application defined according to the multiple-SPA architecture. FIG. 4. shows HTML, data models, and user interfaces for pages/SPAs within an example application defined according to the multiple-SPA architecture. FIG. 5 shows a process wherein pages/SPAs within an example application (which is defined according the multiple-SPA architecture) are loaded. The process of FIG. 5 may, in some embodiments, involve the loading of a child module; FIG. 6 shows an example process for performing this loading process. FIG. 7A shows an example XML file for a child module; FIG. 7B shows an example file that corresponds to the XML file of FIG. 7A, and that contains a JSON child module configuration object. And FIG. 8 shows an example system in which the multiple-SPA architecture may be implemented, wherein hardware aspects of the system are highlighted.

In many places in this document, software modules and actions performed by software modules are described. This is done for ease of description; it should be understood that, whenever it is described in this document that a software module performs any action, the action is in actuality performed by underlying hardware components (such as a processor and a memory) according to the instructions and data that comprise the software module.

Description of FIG. 2

FIG. 2 shows a non-limiting example diagram of a system 220 wherein the multiple-SPA application architecture may be implemented. As will be described below, one or more web applications defined according to the multiple-SPA architecture can be deployed in the system 220, and the various components in the system 220 (such as the client system 210 and server system 200) can perform different functions related to the deployed web applications. As will be discussed below, FIG. 2 shows primarily software modules (such as the web browser application 211) that run at the client system 210 and server system 220; details regarding example hardware components that may be used to execute these software modules are provided below with reference to FIG. 8, as well as in other places in this document.

In the example shown in FIG. 2, the client system 210 can communicate with a server system 200 (e.g., via a network 240). It should be appreciated that the network 240 could comprise a network of interconnected computing devices, such as the Internet. The network 240 could also comprise a local area network (LAN) or could comprise a peer-to-peer connection between the client system 210 and the server system 200.

The server system 200 can include a web server 204 that performs functionality such as implementing the HTTP protocol and communicating with the web browser application 211 (described in further detail below) in the client system 210 via HTTP. The server system 200 can also include an application server 205 that can, for example, execute server-side (or "back end") instructions for applications implemented according to the architecture. The server system 200 can also include a database 206 that manages the persistent storage of data that is used at the server system 200. The database 206 may be or include one or more of: a relational database management system (RDBMS); an object-oriented database management system (OODBMS); an object-relational database management system (ORDBMS); a not-only structured query language (NoSQL) data store; an object cache; a distributed file system; a data cluster (based on technology such as Hadoop); and/or any other appropriate type of data storage system.

The client system 210 can include software components for performing processing related to applications defined according to the multiple SPA architecture. As a non-limiting example, the client system 210 may have a web browser application 211 consisting of, at least, a rendering module 212, a networking module 213 and a JavaScript module 214. Of course, these modules are a non-limiting example, and the application 211 can comprise several more modules and/or different modules than those shown in FIG. 2.

The rendering module 212 can implement functionality for the graphical display and rendering of web page user interfaces. It can, for example, generate graphical data that corresponds to the HTML and/or DOM that defines a web page processed by the web browser application 211; this graphical data can, potentially after further modification/transformation by the operating system of the client system 210, be displayed on a display of the client system 210. Alternatively or additionally, whenever it is described in this document that the client system 210 renders/displays a web page, the rendering/displaying module 212 may perform functionality related to the rendering/display of the web page.

The networking module 213 can implement the HTTP protocol, and be used to handle various HTTP messages between the client system 210 and the web server 204 in the server system 200. Alternatively or additionally, whenever it is described in this document that the client system 210 communicates using HTTP, the networking module 213 may handle the HTTP aspects of such communications.

The JavaScript module 214 can be used to execute JavaScript scripts, manipulate JavaScript objects, modify the DOMs of web pages loaded at the web browser application 211, and perform other functionality related to JavaScript. The JavaScript module may be, for example, a JavaScript engine, a JavaScript virtual machine, a JavaScript runtime, or any other type of software module capable of executing JavaScript instructions. Alternatively or additionally, whenever it is described in this document that the client system 210 performs functionality related to JavaScript, such functionality may be handled by the JavaScript module 214.

Description of FIG. 3

FIG. 3 shows a non-limiting example architecture for a multiple SPA web application. FIG. 3 shows an example multiple SPA web application 300, which consists of multiple SPAs, Page One 301-1, Page Two 301-2, through Page N 301-n.

As shown in FIG. 3, each of the SPAs 301-1, 301-2, 301-n includes a global module 302. The global module 302 can define the content that is reused across multiple pages within the application 300. For example, the global module 302 could define a master page having items such as a page banner that contains global items including a search box, a settings tab, and/or a log-in/log-out tab.

Also as shown in FIG. 3, each of the SPAs 301-1, 301-2, 301-n also includes a content module (e.g., contentModule 303). The content module 303 could be used to populate a body portion of a web page. For example, the content module 303 could define a header, a footer, and/or a body of a page and various sub-portions within each of these portions. Each content module 303 can then be associated with different child modules (e.g., childModuleOne) 304-1-304-n, and the data generated from each child module can be displayed on a user interface, as discussed in more detail below. In some embodiments, a child module may be associated with one or more different views/routes, such that the content generated by the child module is generated (at least in part) by the underlying views.

Description of FIG. 4

FIG. 4 shows a non-limiting example of HTML, data models, and user interfaces for pages/SPAs within an example application defined according to the multiple-SPA architecture.

In the example of FIG. 4, the example application includes two SPAs; one is a "Graph" SPA and one is a "Quotes" SPA. In FIG. 4, the Graph code block 401, Graph data model 402, and Graph user interface 403 correspond to the Graph SPA; the Quotes code block 404, Quotes data model 405, and Quotes user interface 403 correspond to the Quotes SPA.

As noted above, a child module identifier in the URL for a page/SPA can be provided to the content module, and the content module can then use the child module identifier to load the corresponding child module. In the example of FIG. 4, the Graph SPA is available at the URL "http://example.com/graph"; in this example, the child module identifier value is the "graph" segment in the URL Similarly, the Quotes SPA may be available at the URL "http://example.com/quotes"; in this example, the child module identifier value is the "quotes" segment in the URL.

The Graph code block 401 includes a reference to the global module (identified as "globalModule (SPA)"), the content module, and a content controller (identified as "contentController"). When the Graph code block 401 is processed by a web browser application, the content module may load the child module corresponding to the Graph SPA, and the Graph SPA may be represented as a data structure as shown in the Graph data model 402. Additionally, the web browser may generate the Graph user interface 403 based on the Graph data model 402, and display the Graph user interface 403 in a window of the web browser. The web browser may perform processing related to the analogous components for the Quotes SPA (i.e., may perform processing related to the Quotes code block 404, Quotes data model 405, and Quotes user interface 406) in the same or an analogous fashion.

As can be seen in FIG. 4, the data models 402, 405 both contain the common global module and content module. However, the Graph data model 402 differs from the Quotes data model 405 in that each utilizes separate child modules. For example, Graph data model 402 utilizes "graphChildModule" that populates with graph data used by the module where data model 405 utilizes "quotesChildModule" that populates with quotes data used by the module. Consequently, and as shown in FIG. 4, the Graph user interface 403 shows a graph and the Quotes user interface 406 shows different quotes (e.g., stock quotes).

Description of FIG. 5

FIG. 5 shows a non-limiting communication process between client system 500 and server system 520 in a system 540. FIG. 5 relates to an example web application that uses the multiple-SPA architecture described herein. In this example and as will be described in detail below, the modules for two pages/SPAs within the application (a first page and a second page, labeled for the purpose of explanation as "Page One" and "Page Two") are loaded at the client system 500.

Additionally, the below description will build on the example provided above with respect to FIG. 4; further to this example and as will be elaborated on below, Page One corresponds to the "graph" child module and is available at the URL "http://example.com/graph," while Page Two corresponds to the "quotes" child module and is available at the URL "http://example.com/quotes."

Although not shown in FIG. 5, the client system 500 runs a web browser application (e.g., that may correspond to web browser application 211) that includes a rendering module, networking module, and Javascript module, and the server system 520 may run software modules such as a web server, application server, and database module (e.g., that may respectively correspond to web server 204, application server 205, and database 206). And although the network 240 of FIG. 2 is also not shown in FIG. 5, the communications shown in FIG. 5 and described as taking place between the client system 210 and the server system 520 may take place via the network 240.

At action 501, the web browser application in the client system 500 can send an HTTP request message for Page One to the server system 520. This HTTP request message may include fields such as: a request line, which may indicate information such as (i) the type of request (e.g., whether the request is a "GET" request or "POST" request), (ii) a resource field (i.e., a field that indicates the resource being requested), and/or (iii) the version of HTTP being used; one or more header fields (which may include a "Host" header field, which indicates the host to which the request is being sent); and/or a message body. The resource field may include a child module identifier value that is subsequently used in the loading of the child module for Page One, as will be described in further detail below. At action 501, the client system 500 may store the child module identifier value for subsequent use.

As shown in FIG. 5, the URL for Page One may be, as an example, "http://example.com/graph," and the HTTP request message communicated at action 501 may specify this URL. Further to this example, the HTTP request message may be formatted as follows:

---
GET /graph HTTP/1.1
Host: example.com
[empty line]
---

It is noted here that, in this example, "graph" is the child module identifier value (and is in the resource field), and "graph" will be used in the loading of the "graph" child module, as will be described in further detail below.

At action 502, the server system 520 can send, responsive to the HTTP request message of action 501, an HTTP response message for Page One to the web browser application in the client system 500. This HTTP response message may include fields such as: a status line; one or more header fields; and/or a message body. The message body may include HTML code, JavaScript code (which may identify AngularJS modules used in Page One), and other code that corresponds to Page One.

At action 503, the web browser application in the client system 500 can then fetch (i.e., receive from the server system 520 via the network 240, using HTTP) data that includes the code that defines the different AngularJS modules that are used in Page One, as well as related code and/or data. The data that may be fetched here may include the code for the global module, the code for the content module, the code for the child module, a child module configuration object (i.e., a data structure that includes configuration data that specifies characteristics of the child module and how the child module will operate), and/or other modules that are used by the global module, content module, and/or child module. Alternatively or additionally, in some embodiments, the child module configuration object may be received by the web browser application as a JSON object.

The child module configuration object may include information that indicates (i) AngularJS controllers used by the child module, (ii) AngularJS services used by the child module, (iii) AngularJS directives used by the child module, (iv) AngularJS filters used by the child module, (v) views used by the child module, (vi) scripts used by the child module, and/or (vii) other information. For each view used by the child module, the child module configuration object may indicate information such as the route that corresponds to the view, the URL that points to the template for the view, and/or other information. Alternatively or additionally, in some embodiments, the child module configuration object may be an object that has properties as shown in the JSON file shown in FIG. 7B.

After the child module configuration object is received, it may be stored by the web browser application in the memory in the client system 500 for subsequent use. The child module configuration object may be stored such that it can be searched for and retrieved based on the child module identifier; in various embodiments, it may be stored as a global variable, as a local variable, and/or in various data structures such as hash table or array.

Next, at the bootstrap phase at action 504, the web browser application in the client system 500 can load the various modules mentioned above relative to action 503; the loading of the various modules may include actions such as initializing the modules, loading the module into to the memory in the client system 500, and performing configuration operations relative to the modules. This may be performed as follows: the global module and content module are loaded; then, the content module loads the child module, using the child module identifier value as stored previously at, for example, action 501. To load the child module, the content module may also use the child module configuration object, as received at action 503. Alternatively or additionally, in some embodiments, the content module may perform the method shown in FIG. 6 and described below to load the child module.

With this framework, and to summarize the foregoing description of action 504, a child module can be dynamically loaded based on the value of a parameter (the "child module identifier," as noted above) defined in the URL of the page/SPA being loaded; accordingly, each page in the SPA can use the same global and content modules, and the content in individual SPAs in the application is handled by the different child modules (and, in some embodiments, views associated with the child modules).

During the compilation phase at action 505, an initial user interface for Page One is produced for display. To produce the initial user interface for Page One, the web browser application may perform actions such as: traversing the DOM for Page One, identifying the AngularJS directives in the DOM; generating a linking function based on the directive; executing the linking function to produce the HTML that comprises the initial user interface of Page One; and attaching any event listeners that make up the child module (as well as other loaded modules) to the DOM, thereby producing a dynamic DOM. In an embodiment where Page One includes one or more underlying views, the initial user interface for Page One may based produced by an underlying view.

During the runtime data binding phase (or "runtime phase") at action 506, the web browser application will display the user interface for Page One. In an embodiment where Page One includes one or more underlying views, this phase may include the web browser application in the client system 500 navigating between the different views; when moving from a first (displayed view) to a second view, the web browser application may perform asynchronous/background HTTP requests to obtain the data for the second view, and then render the user interface produced by the second view. This runtime data binding phase will continue until an event occurs that results in the web browser application in the client system 500 closing Page One (e.g., the user re-loads Page One, closes Page One, or navigates away from the Page One to another page).

Continuing with the above-mentioned example wherein Page One corresponds to the "graph" child module, in this runtime data binding phase, the web browser application in the client system 500 could use the Graph data model 402 of FIG. 4 to represent Page One, and display the Graph user interface 403 of FIG. 4; and while the Graph user interface 403 is displayed, the user of the client system 500 may view, access, and manipulate the data shown on the Graph user interface 403.

Next, at action 507, the web browser application in the client system can send an HTTP request message for Page Two to the server system 520. This HTTP request message may possess the same and/or similar characteristics as the HTTP request message described above with respect to action 501, except changed to reflect that the HTTP request message of action 507 relates to Page Two.

At action 508, the server system 520 can send, responsive to the HTTP request message of action 507, an HTTP response message for Page Two to the web browser application in the client system 500. This HTTP response message may possess the same and/or similar characteristics as the HTTP response message described above with respect to action 502, except changed to reflect that the HTTP response message of action 508 relates to Page Two.

At action 509, the client system 500 and server system 520 can perform actions that are the same and/or similar to the actions described above with reference to action 503, action 504, action 505, and action 506, except changed to reflect that action 509 relates to Page Two. In other words, at action 509, the client system 500 and server system 520 repeat action 503 through action 508, mutatis mutandis to relate to Page Two instead of Page One.

Continuing with the above-mentioned example wherein Page Two corresponds to the "quotes" child module and is available at the URL "http://example.com/quotes," the HTTP request message of action 507 may, per this example, indicate a request for the resource available at "http://example.com/quotes." Consistent with this example, the child module identifier value would be "quotes," the content module would use this child module identifier value to load the "quotes" child module, and the web browser application would use the Quotes data model 405 of FIG. 4 and display the Quotes user interface 406 of FIG. 4 during the runtime data binding phase.

It should be understood that, although action 501 through action 509 are described above as separate actions with a given order, this is done for ease of description. It should be understood that, in various embodiments, the above-mentioned actions may be performed in various orders; alternatively or additionally, portions of the above-described actions (action 501 through action 509) may be interleaved and/or performed concurrently with portions of the other actions (action 501 through action 509).

Description of FIG. 6

FIG. 6 shows a non-limiting example method that may be performed by the content module (which is executed within the web browser application in the client system 500) for loading a child module. As noted above, the method of FIG. 6 may be performed, in some embodiments, at action 504 of FIG. 5. Alternatively or additionally, the method of FIG. 6 may be performed in any other appropriate context.

As the method of FIG. 6 begins, the content module may have received the child module identifier value and the child module configuration object, with the child module identifier value and child module configuration object having the characteristics described above relative to FIG. 5.

At action 601, the content module may obtain a reference (or, in some embodiments, a pointer) to the child module configuration object based on the name of the corresponding child module (i.e., based on the child module identifier). In various embodiments, this may include performing a lookup for the child module configuration object, and/or performing a search of one or more data structures that include references to child module configuration objects.

In some embodiments, child module configuration objects may be configured such that their names have two parts; the first part of each name may be equivalent to the child module identifier for the child module to which the child module configuration object corresponds, and the second part of each name may be a string (such as "Config") that indicates that the object is a child module configuration object. For example, the child module configuration object for the "graph" child module may be named "graphConfig" and the child module configuration object for the "quotes" child module may be named "quotesConfig"; in these examples the substrings "graph" and "quotes" corresponds to the respective child modules and the substring "Config" indicates that the objects are child module configuration objects. In such an embodiment, the content module may reference the child module identifier (e.g., "graph") and append the configuration object string (e.g., "Config") to the child module identifier to generate the name of the corresponding child module configuration object (e.g., "graphConfig"); the content module may then search on the generated name of the child module configuration object to obtain a reference to the child module configuration object. In some embodiments, searching for the child module configuration object may include calling a Javascript eval( ) function, where the generated name is the argument passed to the eval( ) function. Alternatively or additionally, in an embodiment where child module configuration objects are stored by the web browser application in the client system 500 in a searchable data structure (e.g., a hash table or array), obtaining a reference to the child module configuration object may include searching the data structure, using the generated name as the lookup key.

At action 602, the content module may initialize the child module. This may include actions such as loading the code that defines the child module, allocating memory (in the memory in the client system 500) for the child module, loading the child module object instance into the allocated memory, initializing the properties of the child module, and/or other related activity.

At action 603, the content module may configure the child module based on the configuration data included in the child module configuration object. Action 603 may include reading properties from the child module configuration object, and initializing the constructs associated with the initialized child module based on the properties that have been read. For example, to the extent that the child module configuration object indicates controllers, services, directives, filters, views, scripts, and/or other constructs, the content module may initialize (and register and/or configure, where appropriate) such controllers, services, directives, filters, views, scripts, and/or other constructs in association with the child module. For example, to the extent that the child module configuration object includes views that are associated with the child module, the content module may configure the views and paths/routes for the views.

It should be understood that, although action 601, action 602, and action 603 are described above as separate actions with a given order, this is done for ease of description. It should be understood that, in various embodiments, the above-mentioned actions may be performed in various orders; alternatively or additionally, portions of the above-described actions 601, 602, 603 may be interleaved and/or performed concurrently with portions of the other actions 601, 602, 603.

Description of FIG. 7A and FIG. 7B

FIGS. 7A and 7B show illustrative non-limiting example software code 700 and 701. FIG. 7A shows a non-limiting example XML file 700 corresponding to a specific child module; FIG. 7B shows a Javascript file 701 having at least one JSON object that may be generated from the XML file 700 of FIG. 7A during the process of the development of an application according to the described multiple-SPA architecture. As noted, the Javascript file 701 includes a JSON object; this Javascript file is an example of data that may be received at action 503 of FIG. 5; and this JSON object, when loaded, is an example child module configuration object that may be used as described above at action 504 of FIG. 5, as well as in the method of FIG. 6.

As shown in FIG. 7A, the XML file 700 may contain information related to a "firm" child module. The information included in the XML may include information such as a page identifier ("100000," which is an identifier for the page/SPA/child module), the name for the module ("firm," which is another identifier for the page/SPA/child module), a subapplication name ("IR," referring to a subapplication within the larger application within which the firm child module exists), and a subapplication identifier ("10000000"; as used here, an identifier for the "IR" subapplication). The XML file 700 additionally includes information regarding views associated with the child module. For example, the XML file 700 includes information regarding the "overview" view (which will be available at the "/overview" path/route within the application) and the "firmContacts" view (which will be available at the "/firmContacts" route/path).

As shown in FIG. 7B, the example JavaScript file 701 has a structure for the "firm" child module that parameters and parameter values matching those shown in the XML file 700 of FIG. 7A; but instead of an XML format (as used in the XML file of FIG. 7A), the JavaScript file 701 uses a JSON format to represent the "firm" child module.

Description of FIG. 8

FIG. 8 shows a non-limiting example block diagram of a hardware architecture for a system 820. In the example shown in FIG. 8, a client system 810 communicates with a server system 800 via a network 840. The network 840 could comprise a network of interconnected computing devices, such as the internet. The network 840 could also comprise a local area network (LAN) or could comprise a peer-to-peer connection between the client system 810 and the server system 800.

The example client system 810 and server system 800 could correspond to client system 210 and server system 200 as shown in FIG. 2, and/or the client system 500 and server system 520 shown in FIG. 5. That is, the hardware elements described in FIG. 8 could be used to implement the various software components and actions shown and described herein with reference to FIG. 2 through FIG. 7B, and other places.

For example, the client system 810 in FIG. 8 could include a processor 811, a memory 812, an input/output device 813 (which may also be referred to as a "network interface device"), and a display device 814.

The processor 811 may be or include, for example, a single- or multi-core processor, a plurality of microprocessors, a digital signal processor (DSP), one or more microprocessors in association with a DSP core, one or more Application Specific Integrated Circuits (ASICs), one or more Field Programmable Gate Array (FPGA) circuits, or a system-on-a-chip (SOC). Alternatively or additionally, the processor 811 may be configured to use an instruction set architecture such as x86, ARM, and/or any other instruction set architecture.

The memory 812 may be or may include one or more devices such as a RAM (such as a D-RAM or S-RAM), a hard disk, a flash memory, a magneto-optical medium, an optical medium, or other type of device for volatile or non-volatile data storage.

The I/O device 813 may include one or more devices such as a baseband processor and/or a wired or wireless transceiver. The I/O device 813 may communicate any of the data described herein (including but not limited to HTTP messages) as communicated by the example web browser application 211 and/or the client system 500 of FIG. 5. The I/O device 813 implement layer one, layer two, and/or other layers for communications according to numerous formats, standards, protocols, or technologies, such as but not limited to Ethernet (or IEEE 802.3), ATP, Bluetooth, and TCP/IP, TDMA, CDMA, 3G, LTE, LTE-Advanced (LTE-A), and communications performed by the I/O device 813 may be performed using such technologies.

The display device 814 may be a (Liquid Crystal Display (LCD) display, Light Emitting Diode (LED) display, or other type of display. Although it is described above that the display device 814 may be included in the client system 810, the display device 814 may also, in various embodiments, be external to the client system 810 and connected to the client system 810; for example, the display device 814 may be an external monitor, projector, or other type of display device.

It should be appreciated that the combination of elements 811, 812, 813, 814 in client system 810 could be used to implement each or any combination of the actions, activities, or features described herein as performed by the example web browser application 211 of FIG. 2 and/or the client system 500 of FIG. 5. For example, the memory 812 could load the files associated with the SPA (e.g., HTML, XML, JavaScript files), and/or store the data described herein as processed and/or otherwise handled by the web browser application 211 and/or the client system 500; and the processor 811 could be used to operate the rendering module 212, networking module 213, and JavaScript module 214, and/or otherwise process the data described herein as processed by the web browser application 211 and/or the client system 500.

Alternatively or additionally, the memory 812 in the client system 810 may store instructions which, when executed by the processor 811, cause the processor 811 to perform (in conjunction with, as appropriate, the other elements 812, 813, 814 in the client system 810), each or any combination of the actions, activities, or features described herein as performed by the client system 210 of FIG. 2, example web browser application 211 of FIG. 2, and/or the client system 500 of FIG. 5.

Although the client system 810 has been described above as having a single processor 811, single memory 812, and single input/output device 813, in various embodiments, the client system 810 may include one or more processors (i.e., at least one processor), one or more memories (i.e., at least one memory), and/or one or more input/output devices (i.e., at least one input/output device), having the respective characteristics and/or capable of performing the respective activities described above as performed by the single processor 811, memory 812, and input/output device 813.

Server system 800 also comprises various hardware components used to implement the software elements for server system 200 of FIG. 2 and/or server system 520 of FIG. 5. As shown in FIG. 8, the server system 800 could include hardware components such as a processor 801, a memory 802, and an input/output device 803. The processor 801, memory 802, and input/output device 803 may be the same types of devices, possess the same or similar properties, and/or perform analogous functionality as the processor 811, memory 821, and input/output device 813, respectively, as described above with reference to the client system 810.

The memory 802 in the server system 800 could be used to store data related to applications defined according to the described multiple-SPA architecture. For example, the memory 802 may store the information in database 206 as well as the components and files utilized by web server 204 and application server 205, and/or otherwise store any of the data described herein as processed and/or otherwise handled by the server system 200 and/or server system 520. The processor 801 could be used in executing the software necessary to generate the respective modules that are requested by and transmitted to the client system 810. For example, processor 801 could be used to process data related to the modules handled by application server 205.

Likewise, I/O device 803 can be used by the web server 204 to transmit the different SPA application elements to the client system 810, and/or be utilized by the server system 800 to communicate any of the data described herein (including but not limited to HTTP messages) as communicated by the server system 200 and/or server system 520.

Alternatively or additionally, the memory 802 in the server system 800 may store instructions which, when executed by the processor 801, cause the processor 801 to perform (in conjunction with, as appropriate, the other elements 802, 803 in the client system 810), each or any combination of the actions, activities, or features described herein as performed by the server system 200 of FIG. 2 and/or server system 520 of FIG. 5.

Although the server system 800 has been described above as having a single processor 801, single memory 802, and single input/output device 803, in various embodiments, the server system 800 may include one or more processors (i.e., at least one processor), one or more memories (i.e., one or more memories), and/or one or more input/output devices (i.e., one or more input/output devices), having the respective characteristics and/or capable of performing the respective activities described above as performed by the single processor 801, memory 802, and input/output device 803.

Of course, the hardware configurations shown in FIG. 8 are non-limiting examples, and the subject matter described herein may be utilized in conjunction with a variety of different hardware architectures and elements. For example: in many of the Figures in this document (including but not limited to in FIG. 5 and FIG. 6), individual functional/action blocks are shown; in various embodiments, the functions of those blocks may be implemented using (i) individual hardware circuits, (ii) using applications specific integrated circuitry (ASIC), (iii) using one or more digital signal processors (DSPs), (iv) using the hardware configuration described above with reference to FIG. 8, (v) via other hardware arrangements, architectures, and configurations, and/or via combinations of the technology described in (i) through (v).

Technical Advantages of Described Subject Matter

One commonly understood limitation of traditional SPA technology is that it is difficult to develop large SPAs (i.e., to develop SPAs that have many different views and/or many different types of content). The described multiple SPA architecture may, in some embodiments, be viewed as addressing this issue because, given the common global module and content module, developers are able focus primarily on developing their own child modules. Related to this, the described architecture allows for application-wide elements (such as collections of re-usable AngularJS directives (e.g., user interface elements such as date picker, type ahead, etc.), error logging and tracing features across pages, navigation and helper functions, common script helpers and extensions) to be easily leveraged by developers. Additionally, because of the way in which client modules can be defined with configuration files (and corresponding loaded based on the deployed configuration files), developers are able to easily change the makeup of any given child module, thereby allowing for flexible application development.

Further, applications defined according to the described multiple-SPA architecture may, in some embodiments, enjoy performance benefits such as improved loading times of pages and improvements in the amount of memory used by the applications. Because the memory that is used for a particular page/SPA can be released after that page/SPA is closed, and because the approaches for loading pages described in FIG. 5 and/or FIG. 6 (and in other places) allow for the performant loading of pages/SPAs, applications built using the described multiple-SPA architecture may use less memory and provide for a more responsive user experience as compared to other application architectures, such as an architecture that include a single SPA and many views.

It should be appreciated that the technology described in this document includes many advantages and the advantages mentioned above are non-exhaustive; additionally, it should also be appreciated that while some advantages or combinations of advantages may be present in some embodiments, some advantages or combinations of advantages may not be present in other embodiments; and the advantages of particular embodiments, including those described above, should not be construed as limiting other embodiments or the Claims.

Further Applications of Described Subject Matter

As noted above, in the described multiple-SPA architecture described herein, different child modules can be dynamically loaded for each individual page/SPA in an application, while all of the pages/SPAs in the application use the same global module and content module. As a variation on this, in some embodiments, an application may be defined as having only a single page/SPA. In such an embodiment, a single global module and content module are used; when the first page in the application is loaded, the global module and content module are loaded, and then a child module is loaded by the content module (as described above with respect to FIG. 5, FIG. 6, and elsewhere, mutatis mutandis). Subsequently, when the user navigates to different areas within the application, the different child modules are loaded by the same global module and content module.

Further, as another variation on what was described in the preceding paragraph, a single content module may be able to handle both the multiple-SPA architecture and single-SPA architecture. In such an embodiment, the content module is configured to operate in either a multiple-SPA or single-SPA mode; in the code that defines how the content module loads child modules, the content module checks as to whether it is operating in the multiple-SPA mode or single-SPA mode and loads child modules accordingly. In such an embodiment, a child module could be leveraged in both the multiple-SPA mode or single-SPA mode (i.e., the same child module could be used in both multiple-SPA applications and single-SPA applications, and will be loaded by the content module in the different applications accordingly).

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific described details. In other instances, detailed descriptions of well-known methods, devices, techniques, etc. are omitted so as not to obscure the description with unnecessary detail.

While the subject matter of this document has been described in relation to Javascript technology, AngularJS technology, and other specific technologies, this is done for ease of description; it is to be understood that the subject matter described in this document is applicable in the context of any other appropriate technology, including but not limited to in the context of other SPA technologies, other scripting technologies and/or languages, and/or other web technologies.

While the above subject matter has been described in connection with what is presently considered to be the most practical and preferred embodiment, it is to be understood that the described subject matter is not to be limited to the disclosed embodiments, but on the contrary, the described subject matter should be considered to cover various modifications and equivalent arrangements.

What is claimed is:

1. A method, comprising:
    at a client device that includes a processor, a memory, and a network interface device:
        transmitting, to a web server and via the network interface device, a Hypertext Transfer Protocol (HTTP) request message, wherein:
            the HTTP request message indicates a Uniform Resource Locator (URL) for a first single page application (SPA);
            the first SPA is part of a web application that includes multiple SPAs, wherein the multiple SPAs include the first SPA and a second SPA;
            the first SPA comprises a global module that is common to the multiple SPAs, a content module that is common to the multiple SPAs, and a first child module; and
            a portion of the URL is a first child module identifier that uniquely identifies the first SPA within the web application;
        receiving, from the web server and via the network interface device, one or more HTTP response messages, wherein the HTTP response messages include code that defines the global module, code that defines the content module, code that defines the first child module, and a first child module configuration object that includes configuration data for the first child module;
        loading the global module and the content module;
        loading, by the content module, the first child module using the first child module configuration object;
        displaying a first user interface for the first SPA, wherein the first user interface includes content defined by the global module;
        transmitting, to the web server, a subsequent HTTP request message that includes a second child module identifier in the URL of the subsequent HTTP request, wherein the second child module identifier uniquely identifies the second SPA within the web application;
        receiving, from the web server, one or more subsequent HTTP response messages, wherein the HTTP response messages include code that defines the global module, code that defines the content module, code that defines the second child module, and a second child module configuration object that includes configuration data for the second child module;
        loading, by the content module, the second child module using the second child module configuration object; and
        displaying a second user interface for the second SPA, wherein the second user interface includes the content defined by the global module.

2. The method of claim 1,
    wherein the loading, by the content module, the first child module includes:
        using the first child module identifier to obtain a reference to the first child module configuration object;
        initializing the first child module; and
        configuring the first child module based on the first child module configuration object; and
    wherein the loading, by the content module, the second child module includes:
        using the second child module identifier to obtain a reference to the second child module configuration object;
        initializing the second child module; and
        configuring the second child module based on the second child module configuration object.

3. The method of claim 1, wherein the global module, content module, first child module, and second child module are AngularJS modules.

4. The method of claim 1, wherein the first child module configuration object is received in the one or more HTTP response messages as a JavaScript Object Notation (JSON) object.

5. The method of claim 1,
    wherein the first child module configuration object indicates one or more AngularJS views associated with the first child module,
    wherein each of the AngularJS views is associated with a respective Hypertext Markup Language (HTML) template and route, and
    wherein the method further comprises:
        registering the AngularJS views with an AngularJS routing service.

6. The method of claim 1, wherein:
the displaying the first user interface for the first SPA includes displaying a plurality of elements associated with a first view associated with the first child module; and
the displaying the second user interface for the second SPA includes displaying a plurality of elements associated with a second view associated with the second child module.

7. A client device, comprising:
at least one processor;
at least one memory; and
at least one network interface device;
wherein the at least one processor, the at least one memory, and the at least one network interface device are configured to perform actions that include:
   transmitting, to a server, a request message that includes a Uniform Resource Locator (URL), wherein:
      a first single page application (SPA) is hosted at the URL;
      the first SPA is part of a web application that includes multiple SPAs, wherein the multiple SPAs include the first SPA and a second SPA;
      the first SPA includes a global module that is common to the multiple SPAs, a content module that is common to the multiple SPAs, and a first child module that is specific to the first SPA; and
      a portion of the URL is a first child module identifier that uniquely identifies the SPA;
   receiving, from the server, one or more response messages, wherein the one or more response message include a first child module configuration object that includes configuration data for the first child module;
   loading, by the content module, the first child module;
   generating a first user interface based on the global module and the first child module;
   displaying the first user interface on a display device;
   transmitting, to the server, a subsequent request message that includes a second child module identifier in the URL of the subsequent request, wherein the second child module identifier identifies the second child module;
   receiving, from the server, one or more subsequent response messages, wherein the response messages include a second child module configuration object that includes configuration data for the second child module;
   loading, by the content module, the second child module;
   generating a second user interface based on the global module and the second child module; and
   displaying the second user interface on the display device.

8. The client device of claim 7, wherein the loading, by the content module, the first child module includes:
using the first child module identifier to obtain a reference to the first child module configuration object;
initializing the first child module; and
configuring the first child module based on the first child module configuration object.

9. The client device of claim 7, wherein:
the displaying the first user interface includes displaying a plurality of elements associated with a first view associated with the first child module; and
the displaying the second user interface includes displaying a plurality of elements associated with a second view associated with the second child module.

10. The client device of claim 7, wherein the global module, content module, and child module are Javascript modules.

11. The client device of claim 10, wherein the global module, content module, and child module are AngularJS modules.

12. The client device of claim 11,
wherein the first child module configuration object indicates one or more AngularJS views associated with first the child module,
wherein each of the AngularJS views is associated with a respective Hypertext Markup Language (HTML) template and route, and
wherein the actions further include:
   registering the AngularJS views with an AngularJS routing service.

13. The client device of claim 10, wherein the first child module configuration object is received in the one or more HTTP messages as a JavaScript Object Notation (JSON) object.

* * * * *